Sept. 21, 1965  J. A. SILBEREIS ET AL  3,207,190
BATTERY FILLER
Filed Jan. 3, 1964
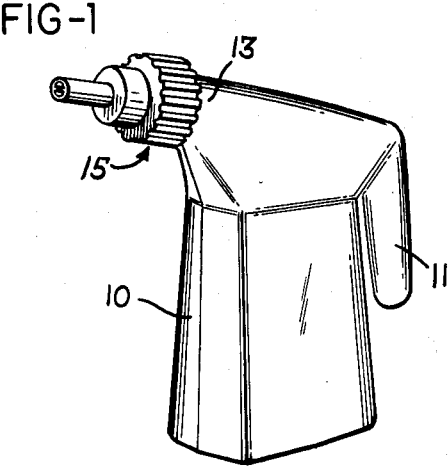
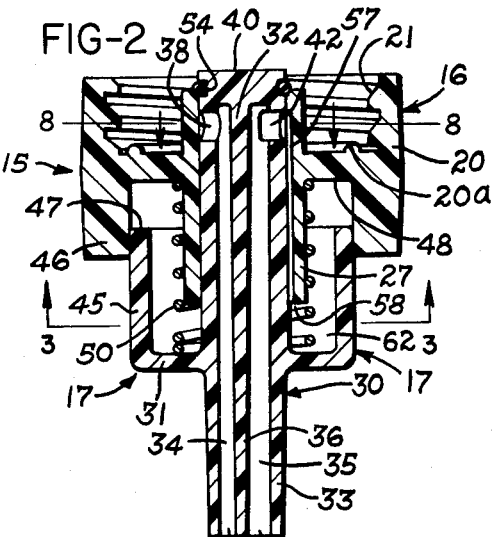
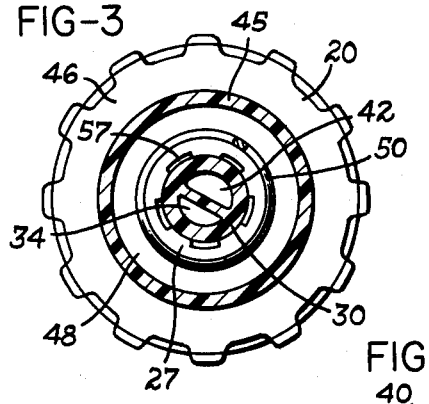
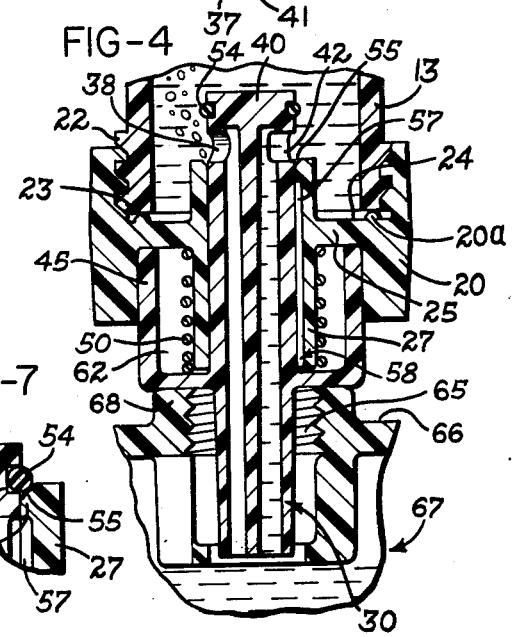
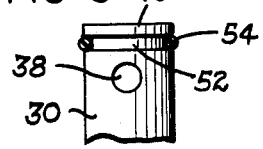
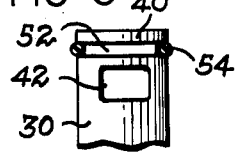
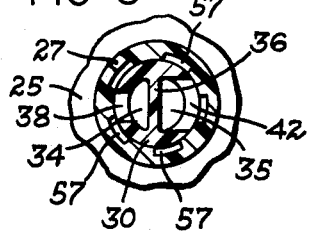
INVENTORS
JOSEPH A. SILBEREIS &
BY GALE A. SETTY
*Marechal, Biebel, French & Bugg*
ATTORNEYS

United States Patent Office 3,207,190
Patented Sept. 21, 1965

3,207,190
BATTERY FILLER
Joseph A. Silbereis and Gale A. Setty, both of Dayton, Ohio, assignors to The Huffman Manufacturing Company, Dayton, Ohio, a corporation of Ohio
Filed Jan. 3, 1964, Ser. No. 335,495
4 Claims. (Cl. 141—198)

This invention relates to a device for dispensing liquids, and particularly to a container having a dispensing spout for automatically filling a storage battery with water to a preset level.

The electric storage batteries of the type used to start the internal combustion engines of modern automobiles or the like must maintain a proper level of acid-water solution at all times to insure that the full potential thereof is developed for a maximum period of time. The water is heated during operation of the automobile and, as a result gradually evaporates, so that it is necessary to replenish the water at periodic intervals. It is customary for most service station attendants to check, and if necessary, fill the liquid in the battery each time a purchase of gasoline is made. The battery filling operation must be performed quickly so that the customer is not inconvenienced and so that the service station can process a large number of customers. In addition, the battery must be filled without the spilling of water on the top surface of the battery which would create a short circuit with a consequent accumulation of deposits on the battery, as well as a reduction in the battery potential, or splashing of an acid mixture on the automobile finish which would quickly deteriorate the same.

A number of automatic dispensers have been designed to fulfill these requirements and to permit flow into the battery only when the pouring spout is fully inserted into the battery, and this flow continues only until the level in the battery reaches a prescribed point, at which time the dispenser is withdrawn without any spillage. Two examples of such dispensers are shown and described in United States Patents of Turner No. 2,463,922, issued March 8, 1949, and of Beall, Jr. No. 3,033,247, issued May 8, 1962. However, each of these designs is quite complex and comparatively expensive to manufacture as a result of the numerous components used in their construction. Moreover, because of this complex structure it is difficult to replace worn or damaged parts with a resulting reduction of the useful life of the dispenser.

Accordingly, it is an object of this invention to provide an improved liquid dispenser of the aforesaid type which is simple in design and operation, and therefore is dependable in operation and inexpensive in cost.

Another object of the invention is to provide an improved and simplified battery filler of the aforesaid type which does not pour until it is inserted into the battery and then only if the liquid level therein is less than a prescribed level, and further to provide a battery filler of the aforesaid type which can be withdrawn from the battery without dripping the liquid onto the top of the battery.

A further object of the invention is to provide a dispensing valve of the aforesaid type for a battery filler which uses only two structural parts thus reducing the cost of manufacture, and further to provide such a dispensing valve whose components can be assembled and disassembled quickly and easily without the use of tools thereby decreasing the manufacturing and maintenance costs and permitting easy replacement of a worn or damaged part.

Other objects and advantages of the invention will be apparent from the following description, the accompanying drawings, and the appended claims.

In the drawings:
FIG. 1 is a perspective view of a battery filler in accordance with the invention;
FIG. 2 is a sectional view through the dispensing valve used on the battery filler shown in FIG. 1.;
FIG. 3 is a sectional view taken essentially along the lines 3—3 of FIG. 2;
FIG. 4 is a sectional view similar to FIG. 2 showing the valve in its open position in cooperation with a battery;
FIG. 5 is an elevation view of the air outlet from the valve;
FIG. 6 is a view similar to FIG. 5 showing the liquid inlet of the valve;
FIG. 7 is an enlarged sectional view showing the retainer seal in accordance with the invention; and
FIG. 8 is a sectional view taken essentially along the line 8—8 of FIG. 2.

Referring to the drawings wherein a preferred embodiment of the invention is shown, FIG. 1 illustrates a battery filler 10 having a carrying handle 11 for inverting the dispenser so that liquid may be poured through the spout 13 as controlled by the dispensing valve 15 mounted thereon. The valve 15 is an important feature of this invention and, as will be seen, it requires only two major parts which can be assembled and disassembled quickly without the use of tools.

Thus, as shown in FIG. 2, the two major parts of the dispensing valve 15 are the body member 16 which is secured on the battery filler 10 and the movable member 17 mounted on the member 16 for cooperation therewith. The body member 16 includes an annular outer body 20 having the internal threads 21 in one end thereof for fluid tight engagement with complementary external threads 22 (FIG. 4) on the spout 13. The threads 21 and 22 cooperate so that the outer periphery 23 of the spout 13 is held tightly against the raised sealing bead 20a on the inner surface 24 of the partition 25 for a fluid tight connection therebetween. The disk shaped partition 25 is formed integrally in the body 20 midway between the ends thereof, and the tubular guide sleeve 27 is similarly formed integrally in the center of the partition 25 coaxially with the outer body 20.

The movable member 17 includes an elongated tube 30 which has a substantially uniform outer diameter which is slightly less than the inner diameter of the guide sleeve 27 and this tube is received for reciprocation within the guide sleeve 27. The tube 30 has a radialy outwardly extending flange 31 formed integrally between the ends thereof for dividing the same into an inner portion 32 and an outer portion 33. The interior of the tube 30 is divided into an air passageway 34 and a liquid passageway 35 by a longitudinal dividing wall 36 formed integrally within and extending the length of the tube 30. The air passageway 34 has an axial air inlet 37 in the outer portion 33 and a radial air outlet port 38 in the inner portion 32 thereof below the closed end 40 of the tube 30. The liquid passageway 35 has a similar axial outlet 41 and a radial inlet port 42 below the end 40.

As seen in FIGS. 4-8, the liquid passageway 35 has a cross-sectional area which is substantially larger than the air passageway 34, and these relative sizes are important to the proper flow of fluids through these passageways, as will be seen. In addition, the ports 38 and 42 of the passageways 34 and 35, respectively, are of sufficient size so that fluid flow through these passageways is not substantially impeded or restricted.

The radial flange 31 has a tubular shield 45 formed integrally therewith and extending in an axial direction toward the end 40 of the tube 36 for enclosing the guide sleeve 27 and associated components. The shield 45 has an outer diameter slightly less than the inner diameter of the adjacent lower portion 46 of the body 20 so that these two components will telescope together until the open end 47 of the shield is closely spaced from the surface 48 of the partition 25. The coil spring 50 is interposed around the guide sleeve 27 between the partition 25 and flange 31 to urge the stationary and movable members 16 and 17 apart by tending to withdraw the tube 30 from the guide sleeve 27.

The closed end 40 of the tube 30 has an external ring groove 52 formed entirely around the periphery thereof for receiving the O-ring retainer seal 54 having an outer diameter when in place which is greater than the inner diameter of the sleeve 27 to limit downward movement of the tube 30 with respect to the guide sleeve 27. As seen in FIG. 7, the inner periphery of the adjacent end of the sleeve 27 has a chamfer 55 formed thereon for cooperation with the seal 54 to block the flow of fluids between the tube 30 and the sleeve 27.

As shown in FIG. 8, a plurality of axial vent grooves 57 are formed in the interior surface of the guide sleeve 27 and extend from the outer end 58 thereof upwardly to a point just below the closed end 40 thereof so that a shoulder 60 is formed at the top of each of these grooves. The circumferential spacing between the grooves 57 is less than the width of either of the ports 38 and 42 of the air and liquid passageways 34 and 35, so that both these passageways are vented when the movable member 17 is in its normal position to prevent liquids from being trapped in either of these passageways. When the tube 30 is in the position shown in FIGS. 2, 7 and 8, the passageways 34 and 35 communicate with the atmosphere through the grooves 57, the chamber 62 between the sleeve 27 and the shield 45, and the slight clearance between the shield 45 and the body 20.

The dispenser valve 15 thus includes only two major structural parts, that is, the stationary and movable members 15 and 17, and a total of only four parts including the spring mechanism 50 and the seal 54 both of which are standard equipment used therewith. There are no screws, bolts, washers, or other miscellaneous parts as are common in the prior art. In addition, the entire valve 15 can be assembled and disassembled quickly without the aid of tools by merely placing the spring 50 around the outside of the guide 27, and then inserting the tube 30 into the guide sleeve 27 in such a manner that the guide 45 fits into the interior lower portion 46 of the body 20. When the ring groove 52 extends beyond the inner end of the guide 27, the resilient O-ring seal 54 is rolled into place and thus the valve 15 is completely assembled. To disassemble the valve 15 it is merely necessary to remove the seal 54 from its groove 52 at which time the movable member can be separated from the stationary member 20.

In operation, when the valve is in its normally closed position, as shown in FIG. 2, fluids cannot flow from the interior of the battery filler 10 into either of the passageways 34 and 35 since the retainer seal 54 blocks flow between the chamfer 55 on the guide sleeve 27 and the adjacent portion of the closed end 40 of the tube 30. The seal 54 is held tightly in this sealing relationship by the force of the spring 50 which urges the movable member outwardly of the stationary member thus slightly compressing the O-ring seal 54 so that it snugly engages the adjacent surfaces of the sleeve 27 and the tube 30. In this normal position, the retainer-seal 54 performs another important function in that it limits the outward movement of the tube 30 in the sleeve 27, and thus locks the entire valve 15 together.

When it is desired to fill a battery or the like to a predetermined depth, the battery filler 10 is grasped by the handle 11 and the outer portion 33 of the tube 30 is inserted into the opening 65 in the top surface 66 of a battery 67, as shown in FIG. 4. When the radial flange 31 engages the boss 68 on the top surface 66 of the battery around the opening 65, the movable member 17 is forced upwardly with respect to the stationary member 15 so that the seal 54 is moved upwardly with respect to the guide sleeve 27. As the member 17 moves to its wide open position wherein the end 47 of the shield 45 engages the surface 48 of the stationary member 15 (FIG. 4), the ports 38 and 42 are moved to a position axially above the guide sleeve 27 where they are in communication with the interior of the battery filler 10.

In this open position, there is a tendency of the water in the battery filler 10 to flow into each of the passageways 34 and 35, but such flow is impeded since no replacement air can flow into the interior of the battery filler 10. However, there is a larger volume of water which tends to flow downwardly in the liquid passageway 35 as compared to passageway 34, and this differential causes the larger volume to continue to flow in the passageway 35, and the flow of water in the air passageway 34 to be drawn upwardly so that air flows from the interior of the battery 67 into the battery filler 10. This action greatly facilitates the flow into the battery so that the desired amount of liquid is poured in a minimum of time without the "gurgling" which reduces the rate of flow and which would tend to occur if the passageways 38 and 42 were not of different sizes.

The length of the lower portion 33 of the tube 30 between the radial flange 31 and the ports 37 and 41 determines the level to which the water in the battery can be filled. That is, when the water level in the battery 67 rises to a level wherein it first contacts the tube 30, the ports 37 and 41 are blocked and additional air cannot flow through the passageway 37, the port 38, and into the interior of the battery filler 10. The water flow in the passageway 35 into the battery is consequently terminated even though the battery filler 10 is held in this position.

Upon termination of the flow into the battery, a column of water remains in the liquid passageway 35 which, if spilled on the top surface of the battery, would tend to short circuit the battery and form deposits thereon, as described above. However, this undesirable spilling is eliminated by venting the top of the column of water so that it drains as the battery filler 10 is withdrawn from the battery 67. As the battery filler 10 is removed, the movable member 17 is returned to its normal position by the spring 50 so that as the O-ring seal 54 again engages the chamfer 55 on the upper end of the guide sleeve 27, the passageways 34 and 35 are again sealed from the interior of the battery filler 10.

The ports 38 and 42 are again moved below the shoulder 60 wherein they are in communication with the atmosphere through the longitudinal grooves 57 in the interior surface of the guide sleeve 27, which connect with the atmosphere through the chamber 60 and the loose fit between the guide 45 and the body 20. Thus air flows into the ports 38 and 42 as the tube 30 is withdrawn from the battery so that the water in the passageway 35 flows under the force of gravity into the battery as the valve 15 is moved upwardly in the inlet 65. Since the air flow through the grooves 57 is substantially unrestricted, the water in either of the passageways 34 and 35 flows easily and quickly into the battery so that the tube 30 is drained by the time it is removed from the battery.

The invention has thus provided an improved and simlified battery filler which can be easily and quickly assembled and disassembled without the use of tools. The dispenser valve uses only two structural members so that the cost of handling component parts, as well as the costs of assembling, maintenance, and repair are substantially less than the prior art device. In addition, the functioning of the valve effects a high rate of water flow into a battery, and eliminates the possibility of spillage during withdrawal of the battery filler.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. A valve and spout mechanism adapted to be secured to the pouring spout of a battery filler comprising, a body member adapted to be secured to the pouring spout, partition means in said body member for covering the spout of the battery filler, said partition means having an integral guide sleeve formed therein perpendicular to said partition means, said guide sleeve having inner and outer sections on opposite sides of said partition means, said inner section adapted to extend a preset distance into the pouring spout of the battery filler, a movable member mounted on said body member for reciprocation along the axis of said guide sleeve, said movable member including a hollow tube received in said sleeve, an exterior radial projection on said tube dividing the same into inner and outer portions on opposite sides of said projection, said inner portion having a uniform outer diameter slightly smaller than the inner diameter of said sleeve so that said inner portion can be inserted through and has a snug fit with said sleeve, said tube having an open end in said outer portion and a closed end in said inner portion, wall means in said tube to separate the interior thereof into two longitudinal separate passages, each of said passages having a radial opening near said closed end of said tube, said radial projection and the closest portion of said openings being spaced apart a distance which is equal to or greater than the length of said sleeve so that said closed end and said openings will pass through said inner section and extend beyond said inner end of said sleeve into the pouring spout, a circumferential ring groove in the external surface of said tube between said closed end and said outlet openings, an internal chamfer on the innermost end of said guide sleeve forming a valve seat, a resilient O-ring seal removably mounted in said groove and extending radially outward of said tube for snug engagement with said valve seat on said guide sleeve to prohibit movement of said closed end of said tube into said guide sleeve, said seal being removable so that said movable member can be separated from said body member by removing said tube from said guide sleeve, and spring means interposed between said body member and said flange for urging said tube to a closed position wherein said O-ring is seated against said inner end to block flow between said tube and the battery filler, and said movable member being movable to an open position wherein said openings are moved outwardly of said guide sleeve for air and liquid flow to and from the battery filler through said passages.

2. A valve and spout mechanism as defined in claim 1 wherein said guide sleeve has an inner diameter adjacent said chamfer which is equal to or slightly less than the outer diameter of said tube adjacent said inner end so that water is blocked from flow between the inner surface of said guide sleeve and the outer surface of said tube when said tube is in said open position.

3. A valve and spout mechanism as defined in claim 1 wherein a plurality of axial grooves are provided on the inner surafce of said guide, said grooves extending from said outer section to a point spaced from said innermost end of said guide sleeve, said grooves being spaced apart a distance less than the width of said openings so that air is vented through said grooves to said passages when said movable member is in said closed position to allow draining of water from said passages and thus avoid dripping.

4. A valve and spout mechanism adapted to be secured to the pouring spout of a battery filler comprising, a body member adapted to be secured to the pouring spout, a partition on said body member for covering the spout of the battery filler, said partition having an integral guide sleeve formed therein perpendicular to said partition, said guide sleeve having inner and outer sections on opposite sides of said partition, a movable member mounted on said body member for reciprocation thereon along the axis of said guide sleeve, said movable member including a hollow tube received in said sleeve, an exterior radial projection on said tube dividing the same into inner and outer portions on opposite sides of said partition, said inner portion having a uniform outer diameter slightly smaller than the inner diameter of said sleeve so that said inner portion can be inserted through and has a snug fit with said sleeve, said tube having an open end in said outer portion and a closed end in said inner portion, wall means in said tube to separate the interior thereof into two longitudinal separate passages, each of said passages having a radial opening near said closed end of said tube, said radial projection and the closest portion of said openings being spaced apart a distance which is equal to or greater than the length of said sleeve so that said closed end and said openings will pass through said inner section and extend beyond said inner end of said sleeve into the pouring spout, a circumferential ring groove in the external surface of said tube between said closed end and said outlet openings, a resilient O-ring seal removably mounted in said groove and extending radially outward of said tube for snug engagement with the innermost end of said inner section of said guide sleeve to prohibit movement of said closed end of said tube into said guide sleeve, and spring means interposed between said body and movable members for urging said tube to a closed position wherein said O-ring seal is urged against said innermost end of said tube to block flow between said tube and the battery filler, said members being movable to an open position wherein said openings are moved outwardly of said guide sleeve for air and liquid flow to and from the battery filler through said passages.

References Cited by the Examiner

UNITED STATES PATENTS

| | | | |
|---|---|---|---|
| 2,660,834 | 12/53 | MacGlashan | 137—505.39 |
| 2,686,652 | 8/54 | Carlson et al. | 222—153 X |
| 2,690,895 | 10/54 | Barcus | 222—353 X |
| 2,915,224 | 12/59 | Beall | 222—484 X |
| 2,963,205 | 12/60 | Beall | 141—292 X |
| 2,971,090 | 2/61 | Piet et al. | 137—620 |
| 3,033,247 | 5/62 | Beall | 141—308 |

LAVERNE D. GEIGER, *Primary Examiner.*